United States Patent [19]

Shingo et al.

[11] Patent Number: 4,767,580

[45] Date of Patent: Aug. 30, 1988

[54] PROCESS FOR PREPARATION OF POROUS SHEETS

[75] Inventors: Kaneko Shingo, Houfu; Shunichi Nakamura, Hikari; Hisashi Nakanishi, Tokuyama, all of Japan

[73] Assignee: Tokuyama Soda Kabushiki Kaisha, Yamaguchi, Japan

[21] Appl. No.: 936,357

[22] Filed: Dec. 1, 1986

[30] Foreign Application Priority Data

Nov. 29, 1985 [JP] Japan .................. 60-268897

[51] Int. Cl.$^4$ .................. C08J 9/00; B29C 67/20; B29C 55/02
[52] U.S. Cl. .................. 264/41; 264/45.3; 264/147; 264/288.8
[58] Field of Search .................. 264/41, 147, 288.8, 264/45.3

[56] References Cited

U.S. PATENT DOCUMENTS 4,331,622  5/1982  Doi et al. .................. 264/41 X
4,472,328  9/1984  Sugimoto et al. .................. 264/41

FOREIGN PATENT DOCUMENTS 57-47334    3/1982  Japan .
60-6442     1/1985  Japan .
60-6441     1/1985  Japan .
60-199037  10/1985  Japan .

Primary Examiner—Philip Anderson
Attorney, Agent, or Firm—Sherman and Shalloway

[57] ABSTRACT

A porous sheet having a good softness and being excellent in moisture permeability, water resistance and mechanical strength characteristics such as tensile strength and tear strength is obtained by forming into a sheet a composition comprising 100 parts by weight of a polyolefin resin, 50 to 400 parts by weight of a filler and 0.1 to 10 parts by weight of a silicone oil, and drawing the sheet.

7 Claims, No Drawings

PROCESS FOR PREPARATION OF POROUS SHEETS

BACKGROUND OF THE INVENTION (1) Field of the Invention

The present invention relates to a process for the preparation of porous sheets. More particularly, the present invention provides a process for the preparation of a porous sheet excellent in the moldability such as the adaptability to extrusion or drawing and the physical properties such as the water resistance, which comprises forming a composition comprising a polyolefin resin, a filler and a silicone oil into a sheet and drawing the formed sheet.

(2) Description of the Prior Art

As the conventional process for preparing a porous sheet, there is known a process in which an inorganic filler is incorporated in such a large amount as 40% by weight or more into a polyolefin resin such as polyethylene or polypropylene, the mixing is molded into a sheet and the sheet is uniaxially or biaxially drawn. The porous sheet obtained according to this process allows permeation of gases such as air and vapors such as water vapor but it hardly allows permeation of a liquid having a high polarity, such as water. The porous sheet is used as a packaging material for a dehumidifying agent by utilizing this property. Furthermore, by utilizing the property that dewing is not caused because of a high air permeability, the porous sheet is preferably used as a wall paper or a packaging material for various materials. Recently, it is expected that if a good softness is imparted to this porous sheet having such excellent properties, the porous sheet will be used in the field of simple clothing articles such as throw-away diapers and raincoats.

The porous sheet to be used in this field should have not only a high softness but also high tensile strength, high tear strength, high elongation and high water resistance, that is, the property that permeation of water is not allowed under atmospheric pressure.

As means for obtaining a porous sheet satisfying these requirements, there has been proposed a process in which linear low-density polyethylene is used as the polyolefin resin. However, a sheet obtained by incorporating a large amount of a filler into such linear low-density polyethylene, molding the mixture into a sheet and uniaxially drawing the sheet is defective in that the tear strength in the drawing direction is reduced. Furthermore, a sheet obtained by biaxially drawing the molded sheet is defective in that uniform whitening is not attained because interfacial peeling between the filler and the matrix resin is not uniformly effected, and also in that the surface strength is reduced. As means for eliminating these defects, there has been proposed a process in which the draw ratio is reduced. However, according to this process, drawing unevenness is increased and uniform whitening is not attained, though reduction of the surface strength is moderated. Trails have been made to obtain uniform whitening by incorporating a polyhydroxyl saturated hydrocarbon, an epoxy type plasticizer or a polyester type plasticizer into a polyolefin resin. However, these trails are defective in that a sufficient effect is not attained unless the additive is used in a relatively large amount and if the additive is added in a large amount, the additive bleeds out to the surface to render the surface sticky or generate a bad smell. Accordingly, sheets prepared according to these proposals are not suitable as packaging materials for food and the like or as clothing articles such as diapers, and application fields of these sheets are limited.

In the specification of U.S. Pat. No. 4,613,643, we previously proposed a process for the preparation of soft porous sheets, which comprises forming into a sheet a composition comprising (i) 40 to 80% by weight of an inorganic filler and (ii) 60 to 20% by weight of a polyolefin type thermoplastic elastomer composition comprising at least 50% by weight of a polyolefin type thermoplastic elastomer substantially free of a polar group, in which the tensile stress at a temperature of 25° C. under 100% stretching (100% modulus) is 10 to 100 $Kg/cm^2$, the elongation at break under stretching is at least 100% and the permanent strain under 100% stretching is less than 50%, and up to 50% by weight of a thermoplastic plastomer, and stretching the sheet at a temperature lower than the softening temperature of the polyolefin type thermoplastic elastomer. A porous sheet obtained according to this process has a good combination of flexiblity, air permeability and water resistance. Furthermore, in Japanese Patent Application No. 266437/84, we proposed a process comprising homogeneously mixing (i) 100 parts by weight of a mixture comprising 100 parts by weight of a crystalline polyolefin resin and 20 to 100 parts by weight of a copolymer of ethylene with other α-olefin, which has an X-ray crystalline degree of 5 to 25% and a density of 0.88 to 0.9 $g/cm^3$, with (ii) 50 to 400 parts by weight of an inorganic filler and (iii) 0.1 to 20 parts by weight of a polyester type plasticizer and/or an epoxy type plasticizer, molding the mixture into a sheet and drawing the sheet. These processes are effective for obtaining porous sheets satisfying the above-mentioned requirements of the physical properties. However, these processes are defective in that an expensive elastomer or copolymer should be used in a large amount, and furthermore, the latter process is defective in that a platicizer generating a bad smell has to be used. Accordingly, further improvements are desired.

SUMMARY OF THE INVENTION

It is therefore a primary object of the present invention to provide a porous sheet having a good air permeability and such as water resistance that permeation of water is not allowed under atmospheric pressure, which has a good softness and is excellent in mechanical strength characteristics such as tensile strength and tear strength and which is cheap.

More specifically, in accordance with the present invention, there is provided a process for the preparation of porous sheets, which comprises forming into a sheet a composition comprising 100 parts by weight of a polyolefin resin, 50 to 400 parts by weight of a filler and 0.1 to 10 parts by weight of a silicone oil, and drawing the sheet.

By the term "sheet" used in the instant specification is meant not only a film or sheet but also a tubular, cylindrical or other shaped article of a film or sheet.

DETAILED DESCRIPTION OF THE PREFERRED EMBODIMENTS

Any of homopolymers and copolymers of olefins such as ethylene and propylene can be used as the polyolefin resin without any limitation in the present invention. For example, there can be mentioned low-density polyethylene, high-density polyethylene, medium-density polyethylene, linear low-density polyethylene, polypropylene and block and random copolymers of propylene with a small amount of ethylene. A crystalline polyolefin resin having an X-ray crystalline degree of at least 40%, especially a polyolefin resin having a density of 0.910 to 0.940 g/cm$^3$ and a melt flow rate (MFR) of 0.1 to 10 g/10 min, particularly 0.1 to 5 g/10 min, is preferred, and linear low-density polyethylene is most preferred. In the present invention, it is sometimes preferred that a mixture of two or more of the foregoing homopolymers and copolymers be used. Especially when a mixture of a crystalline polyolefin resin such as high-density polyethylene, linear low-density polyethylene or polypropylene and a copolymer of ethylene with other α-olefin having an X-ray crystallization degree of 5 to 25% and a density of 0.86 to 0.90 g/cm$^3$ (hereinafter referred to as "soft resin") is used, a high softness is imparted to the obtained porous sheet without degradation of the air permeability and the mechanical strength characteristics such as tensile strength and tear strength are improved. Accordingly, when this mixed resin is used, a porous sheet having high quality can be effectively obtained. This soft resin will now be described in detail. This soft resin is a random copolymer of ethylene with an α-olefin having 4 to 7 carbon atoms, in which the ethylene content is 86 to 95 mole%, the X-ray crsytallization degree is 5 to 25%, the density as determined according to the method of ASTM D-1505 is 0.86 to 0.90 g/cm$^3$, the melting point determined by a differential scanning calorimeter (DSC) is 60° to 100° C. and the Shore hardness D is 20 to 40. Namely, the soft resin has properties intermediate between the properties of a rubbery polymer and the properties of a crsytalline plastic material. If the density of the soft resin is lower than 0.86 g/cm$^3$ or the crystallization degree of the soft resin is lower than 5%, the tensile strength and the gas permeability, particularly the water vapor permeability, of the resulting drawn sheet are degraded. If the density exceeds 0.90 g/cm$^3$ or the crystallization degree exceeds 25%, the resulting drawn sheet tends to have a reduced softness. In order to improve the moldability mechanical properties of the drawn sheet, it is preferred that the melt flow rate (MFR) of the soft resin at 190° C. be 0.1 to 30 g/10 min. If the MRF value of the soft resin is lower than 0.1 g/10 min, the melt viscosity is high, and if the MFR value exceeds 30 g/10 min, the melt viscosity is low. Namely, in each case, the moldability is degraded and the tensile strength of the obtained sheet is low.

In the present invention, it is indispensable that the soft resin should be incorporated in an amount of up to 100 parts by weight per 100 parts by weight of the crystalline polyolefin resin. If the amount of the soft resin exceeds 100 parts by weight per 100 parts by weight of the crystalline polyolefin resin, in order to impart a dimension stability to the drawn sheet, it becomes necessary to thermally set the drawn sheet, and by this setting oepration, the water vapor permeability of the drawn sheet is degraded.

The kind of the filler used in the present invention is not particularly critical. A powdery or particulate filler which can be dispersed in the polyolefin resin and is not decomposed, volatilized or molten at a temperature lower than the molding temperature is used. Namely, fillers customarily incorporated in rubbers or plastics can be used. For example, there can be mentioned calcium carbonate, gypsum, calcium sulfite, calcium phosphate, magnesium carbonate, basic magnesium carbonate, magnesium suflate, hydrous silicic acid, anhydrous silicic acid, soda ash, sodium chloride, barium sulfate, clay, cements, volcanic ash, fine sand, titanium oxide, iron oxide, carbon black, metal powders, other inorganic fillers and organic metal salts composed mainly of inorganic substances. The filler is used in the powdery or particulate form having an average particle size smaller than 50μ, preferably 0.05 to 30μ, especially preferably 0.1 to 5μ. If a filler having too large an average particle size, since the size of pores of the drawn sheet is increased and the number of particles per unit weight is decreased, the denseness of the drawn sheet is degraded. If a filler having too small an average particle size is used, uneven drawing is readily caused and a good porous sheet cannot be obtained. The filler is incorporated in an amount of 50 to 400 parts by weight, preferably 60 to 300 parts by weight, per 100 parts by weight of the polyolefin resin. If the amount of the filler is smaller than 50 parts by weight per 100 parts by weight of the polyolefin resin, the number of intercommunicating pores is reduced in the obtained porous sheet, resulting in reduction of the air permeability. If the amount of the filler is larger than 400 parts by weight per 100 parts by weight of the polyolefin resin, molding and drawing of the sheet become difficult.

The most characteristic feature of the present invention resides in that silicone oil is incorporated into the above-mentioned polyolefin resin and filler. In case of this composition, molding and drawing of the sheet can be very easily accomplished, and a porous sheet excellent in softness, mechanical strength characteristics such as tensile strength and tear strength, elongation, air permeability and water resistance is obtained and the water resistance is especially improved.

The silicone oil used in the present invention is ordinarily an organopolysiloxane which is oily or greasy at normal temperature. The kind of the silicone oil is not particularly critical, so far as it has such a high boiling point and such a high heat resistance that the silicone oil is not volatilized at the melting temperature of the polyolefin resin. A silicone oil having a viscosity of 50 to 500,000 cSt, especially 500 to 10,000 cSt, is preferred. For example, polydimethylsiloxane and polymethylphenylsiloxane are preferably used. In the present invention, the silicone oil is incorporated in an amount of 0.1 to 10 parts by weight, preferably 1 to 5 parts by weight, per 100 parts by weight of the polyolefin resin. If the amount of the silicone oil is smaller than 0.1 part by weight per 100 parts by weight of the polyolefin resin, uniform whitening is difficult in the sheet (starting undrawn sheet), and if the amount of the silicone oil is larger than 10 parts by weight per 100 parts by weight of the polyolefin resin, the extrusion moldability becomes uneven and it is difficult to obtain a sheet having a uniform thickness.

In the present invention, the composition is prepared according to a method in which by using a high-speed stirrer (mixer) such as a Henschel mixer, the silicone oil is incorporated and mixed into the filler and the resulting mixture is mixed with a powder or pellet of the polyolefin resin, or a method in which by using the above-mentioned mixer, the silicone oil is incorporated and mixed into a mixture of a powder or pellet of the polyolefin resin and the filler and the resulting mixture is kneaded by a mixing roll or screw extruder. In preparing the composition, a small amount of a stabilizer or pigment or stearic acid or its metal salt for imparting a flowability may be added simultaneously or separately.

The method for forming the composition into a sheet is not particularly critical. However, an inflation molding method using a circular die or an extrusion molding method using a T-die is ordinarily preferred.

The formed sheet is uniaxially or biaxially drawn according to a known method. Uniaxially drawing is performed in the extrusion direction (MD direction) according to a roll-drawing method using two sets of rolls. Biaxial drawing may be accomplished by either a sequential biaxial drawing method in which the sheet is once drawn in the MD direction or the transverse direction (TD direction) and then, the sheet is drawn in the direction orthogonal to the primary drawing direction or a simultaneous biaxial drawing method in which the sheet is drawn simultaneously in the MD direction and TD direction. The drawing operation is carried out at a temperature higher than room temperature but lower than the melting point of the polyolefin resin, and a temperature lower by 10° C. than the melting point of the polyolefin resin is preferred. The sheet is drawn in at least one direction at a draw ratio of 1.2 to 3.0. In case of biaxial drawing, the draw ratio in each direction is 1.2 to 3.0, preferably 1.5 to 2.0. If the draw ratio is within this range, excellent air permeability and high water resistance can be attained while maintaining a good mechanical balance and good strength characteristics. If the draw ratio exceeds 3.0, drastic degradation of the tear strength is caused. It is generally preferred that after the drawing step, the drawn sheet be heat-treated under tension, cooled to a temperature lower than the drawing temperature or to room temperature and then withdrawn. This heat treatment is ordinarily carried out at a temperature lower than the drawing temperature but higher than room temperature for several seconds to several minutes. At a low temperature, the heat treatment time is prolonged. Furthermore, in order to improve the printability or adhesiveness of the sheet, a surface treatment such as a corona discharge treatment may be carried out.

According to the present invention, since the silicone is incorporated, interfacial peeling between the polyolefin resin and the filler is easily accomplished, and therefore, even at a low draw ratio, uniform fine pores can be obtained. Moreover, the water repellency of the porous sheet of the present invention is improved over that of the conventional porous sheet, and the water resistance is enhanced. Moreover, when the sheet of the present invention is molded and drawn, good uniform whitening is attained and the moldability of the sheet is so good that the sheet can be drawn at a low draw ratio. If the thickness of the porous sheet obtained according to the present invention is adjusted to 0.01 to 1.0 mm, softness, gas permeability, especially water vapor permeability, mechanical strength characteristics such as tensile strength and tear strength, elongation, water repellency (water resistance) and dimension stability are highly improved, and the porous sheet is suitably used in the field of simple clothing articles.

The present invention will now be described in detail with reference to the following examples and comparative examples. Incidentally, the physical properties mentioned in these examples were determined according to the following methods.

(1) Extrudability

Extrusion was carried out under extrusion conditions described below by using an inflation extruder having a screw diameter of 50 mm and a die diameter of 150 mm, and the extrudability was evaluated according to the standard mentioned below.

Extrusion Conditions
  Cylinder temperature: 160° C., 170° C. and 175° C.
  Adapter temperature: 180° C.
  Die temperature: 180° C.
  Screw rotation number: 70 rpm
  Take-up speed: 8 m/min Evaluation Standard
  O: uniform thickness and stable take-up
  Δ: almost uniform thickness and slightly unstable take-up
  X: uneven thickness and unstable take-up (2) Drawability The drawability was evaluated according to the following standard.
  O: uniform whitening at draw ratio lower than 2.0
  Δ: uniform whitening at draw ratio of 2.0 to 3.0
  X: uniform whitening or breaking at draw ratio higher than 3.0

(3) Tear Strength and Elongation

The measurement was carried out at a pulling speed of 200 mm/min according to the method of JIS P-8113. In connection with the strength and elongation, the value in the MD direction is shown in the numerator and the value in the TD direction is shown in the denominator. This will similarly apply with respect to the tear strength described below.

(4) Tear Strength

The tear strength was measured according to the method of JIS L-1085 A-1.

(5) Water Vapor Permeability (Moisture Permeability)

The water vapor permeability was measured at a temperature of 25° C. and a relative humidity of 90% according to the method of JIS Z-0208.

(6) Water Resistance

The water resistance was measured according to the method of JIS L-1092-B.

EXAMPLES 1 THROUGH 3 AND COMPARATIVE EXAMPLES 1 THROUGH 5

To 100 parts by weight of linear low-density polyethylene (LLDPE) (Sumikathene-LFA201-0 supplied by Sumitomo Kagaku, X-ray crystallization degree=46.5%, MFR=2.0 g/10 min, density=0.92 g/cm$^3$) were added 150 parts by weight of heavy calcium carbonate (Whiton SSB Red supplied by Shiraishi Calcium, average particle size=1.2$\mu$) and 3 parts by weight of an additive shown in Table 1, and the resulting composition was mixed by a 100-liter super mixer and was then pelletized by a biaxial extruder. The pellet was formed into a cylindrical sheet having a thickness of 60$\mu$ and a flat width of 350 mm under the extrusion conditions described above, and the sheet was uniaxially drawn at 60° C.

The physical properties of porous sheets prepared in the above-mentioned manner were determined according to the above-mentioned methods. The obtained results are shown in Table 2.

In connection with the drawability, in each of Comparative Examples 1 through 3, uniform whitening was caused at a draw ratio higher than 3.5, and in Comparative Example 4, uniform whitening was caused at a draw ratio higher than 2.5. In each of Examples 1 through 3, uniform whitening was attained at a draw ratio lower than 2.0. Thus, it was confirmed that by incorporation of a small amount of a silicone oil, uniform drawing can be done.

The water pressure resistance of the sheet obtained in Examples 2 was higher than that of the sheet obtained in Comparative Example 4, and it was found that the sheet obtained in Example 2 is suitable as a moisture-permeable and water-repellent sheet.

EXAMPLE 7 AND COMPARATIVE EXAMPLE 7

An undrawn sheet having a thickness of 70μ was prepared in the same manner as described in Example 1 by using a composition shown in Table 4, and the drawn sheet was biaxially drawn at 80° C. by a bench-scale drawing machine.

TABLE 1

| Kind | Contents |
| --- | --- |
| liquid polybutene-1 | Nisseki Polybutene HV-100 supplied by Nippon Sekiyu Kagaku |
| stearic acid | VLZ-200 supplied by Kawaken Fine Chemical |
| liquid hydroxyl saturated hydrocarbon | Nisso Polybutadiene G1-2000 supplied by Nippon Soda |
| dimethylsilicone oil | TSF-451 supplied by Toshiba Silicone, viscosity = 2000 cSt (25° C.) |
| methylphenylsilicone oil | TSF-433 supplied by Toshiba Silicone, viscosity = 550 cSt (25° C.) |

TABLE 2

| | Composition | | | | | | | Moldability | |
| --- | --- | --- | --- | --- | --- | --- | --- | --- | --- |
| | Polyolefin Resin | Amount (parts by weight) | | Amount (parts by weight) | | Amount (parts by weight) | | Extrudability | Drawability |
| | Amount (parts by weight) | | Filler | | Additive | | | | |
| Example 1 | LLDPE | 100 | calcium carbonate | 150 | dimethylsilicone | 3.0 | | O | O |
| Example 2 | " | 100 | calcium carbonate | 150 | dimethylsilicone | 3.0 | | O | O |
| Example 3 | " | 100 | calcium carbonate | 150 | methylphenylsilicone | 3.0 | | O | O |
| Comparative Example 1 | " | 100 | calcium carbonate | 150 | — | — | | O | X |
| Comparative Example 2 | " | 100 | calcium carbonate | 150 | liquid polybutene-1 | 3.0 | | O | X |
| Comparative Example 3 | " | 100 | calcium carbonate | 150 | stearic acid | 3.0 | | O | X |
| Comparative Example 4 | " | 100 | calcium carbonate | 150 | liquid hydroxyl-polybutadiene | 3.0 | | O | Δ |
| Comparative Example 5 | " | 100 | calcium carbonate | 150 | dimethylsilicone | 3.0 | | O | O |

| | Properties of Drawn Sheet | | | | | | |
| --- | --- | --- | --- | --- | --- | --- | --- |
| | Draw Ratio | Thickness (μ) | Tensile Strength (kg/cm$^2$) | Elongation (%) | Tear Strength (g) | Moisture Permeability (g/m$^2$ · 24 hrs.) | Water Pressure Resistance (mm H$_2$O) |
| Example 1 | 8 | 52 | 128/44 | 330/730 | 38/84 | 1850 | 23000 |
| Example 2 | 2.5 | 48 | 137/39 | 240/760 | 19/83 | 2150 | 17000 |
| Example 3 | 1.8 | 50 | 125/45 | 380/730 | 38/85 | 1950 | 23000 |
| Comparative Example 1 | 1.8 | measurement impossible by extreme drawing unevenness | | | | | |
| Comparative Example 2 | 1.8 | measurement impossible by extreme drawing unevenness | | | | | |
| Comparative Example 3 | 1.8 | measurement impossible by extreme drawing unevenness | | | | | |
| Comparative Example 4 | 2.5 | 47 | 144/35 | 260/730 | 20/80 | 2200 | 12000 |
| Comparative Example 5 | 4.0 | 31 | 147/36 | 210/730 | 8/81 | 2600 | 8000 |

EXAMPLES 4 THROUGH 6 AND COMPARATIVE EXAMPLE 6

Drawn sheets were prepared in the same manner as described in Example 1 except that the amount added of the silicone oil was changed. The obtained results are shown in Table 3. When the amount of the silicone oil was larger than 10 parts by weight, an uneven flow came out from the die and it was impossible to take up an extrusion sheet.

In the sheet obtained in Comparative Example 7, certain drawing unevenness was observed and the moisture permeability was low.

EXAMPLES 8 AND 9 AND COMPARATIVE EXAMPLE 8

Undrawn sheets were prepared in the same manner as described in Example 1 by using a composition shown in Table 4 while changing the amount of calcium carbonate, and they were uniaxially drawn at 80° C. by a bench-scale drawing machine.

In Comparative Example 8, since extrusion was unstable, it was impossible to take up a sheet.

TABLE 3

| | Composition | | | Moldability | |
|---|---|---|---|---|---|
| | Resin (parts by weight) | Filler (parts by weight) | Additive (parts by weight) | Extrudability | Drawability |
| Example 4 | LLDPE, 100 | calcium carbonate, 150 | dimethyl silicone, 1.5 | O | O |
| Example 5 | LLDPE, 100 | calcium carbonate, 150 | dimethyl silicone, 5.0 | O | O |
| Example 6 | LLDPE, 100 | calcium carbonate, 150 | dimethyl silicone, 10.0 | O | O |
| Comparative Example 6 | LLDPE, 100 | calcium carbonate, 150 | dimethyl silicone, 13.0 | X | — |

| | Properties of Drawn Sheet | | | | | |
|---|---|---|---|---|---|---|
| | Draw Ratio | Thickness ($\mu$) | Tensile Strength (kg/cm$^2$) | Elongation (%) | Tear Strength (g) | Moisture Permeability (g/m$^2 \cdot$ 24 hrs.) | Water Pressure Resistance (mm H$_2$O) |
| Example 4 | 1.8 | 50 | 131/45 | 330/730 | 35/88 | 1850 | 18000 |
| Example 5 | 1.8 | 50 | 130/48 | 370/720 | 34/89 | 1780 | 24000 |
| Example 6 | 1.8 | 50 | 129/46 | 350/740 | 36/93 | 1700 | 24500 |
| Comparative Example 6 | — | — | — | — | — | — | — |

TABLE 4

| | Composition | | | Moldability | |
|---|---|---|---|---|---|
| | Resin (parts by weight) | Filler (parts by weight) | Additive (parts by weight) | Extrudability | Drawability |
| Comparative Example 7 | LLDPE, 100 | calcium carbonate 45 | dimethylsilicone, 3.0 | O | Δ |
| Example 7 | LLDPE, 100 | calcium carbonate, 55 | dimethylsilicone, 3.0 | O | O |
| Example 8 | LLDPE, 100 | calcium carbonate, 200 | dimethylsilicone, 6.0 | O | O |
| Example 9 | LLDPE, 100 | calcium carbonate, 300 | dimethylsilicone, 6.0 | O | O |
| Comparative Example 8 | LLDPE, 100 | calcium carbonate, 450 | dimethylsilicone, 6.0 | X | — |

| | Draw Ratio | Thickness ($\mu$) | Tensile Strength (kg/cm$^2$) | Elongation (%) | Tear Strength (g) | Moisture Permeability (g/m$^2 \cdot$ 24 hrs.) | Water Pressure Resistance (mm H$_2$O) |
|---|---|---|---|---|---|---|---|
| Comparative Example 7 | 3.0 × 3.0 | 42 | 310/270 | 170/190 | 45/53 | 700 | 25000 |
| Example 7 | 3.0 × 3.0 | 45 | 240/210 | 150/180 | 43/58 | 1530 | 22000 |
| Example 8 | 1.3 | 50 | 115/46 | 260/640 | 12/60 | 1600 | 24000 |
| Example 9 | 1.3 | 50 | 80/32 | 120/340 | 4/30 | 1850 | 23000 |
| Comparative Example 8 | — | — | — | — | — | — | — |

EXAMPLES 10 THROUGH 15

Sheets were formed in the same manner as described in Example 1 by using as the resin linear low-density polyethylene (LLDPE) (same as used in Example 1), polypropylene (Tokuyama Polypro YE-130 supplied by Tokuyama Soda, MFR=4.0 g/10 min), a blend of LLDPE as described above and a soft resin having a density of 0.89 (Tufmer A4090 supplied by Mitsui Sekiyu Kagaku, ethylene content=95 mole%, butene-1 content=5 mole%, MFR=0.90 g/10 min at 190° C.), or high-density polyethylene (HDPE) (Sholex N5008 supplied by Showa Denko, MFR=0.9 g/10 min, density=0.95), and the sheets were uniaxially drawn at 80° C. As shown in Table 5, each sheet could be uniformly drawn at a draw ratio lower than 2. Furthermore, the above procedures were repeated by using talc or diatomaceous earth as the filler instead of calcium carbonate. The obtained results are shown in Table 5.

TABLE 5

| | Composition | | | | Moldability | |
|---|---|---|---|---|---|---|
| | Resin-1 (parts by weight) | Resin-2 (parts by weight) | Filler (parts by weight) | Additive (parts by weight) | extrudability | Drawability |
| Example 10 | polypropylene, 100 | — | calcium carbonate, 150 | dimethylsilicone, 3.5 | O | O |
| Example 11 | LLDPE, 100 | soft resin, 50 | calcium carbonate, 200 | dimethylsilicone, 3.5 | O | O |
| Example 12 | HDPE, 100 | — | calcium carbonate, 150 | dimethylsilicone, 3.5 | O | O |
| Example 13 | LLDPE, 100 | — | talc 80 | dimethylsilicone, 3.0 | O | O |
| Example 14 | LLDPE, | — | diatomaceous earth | dimethylsilicone, | O | O |

TABLE 5-continued

| | | | | | | | |
|---|---|---|---|---|---|---|---|
| Example 15 | 100 LLDPE, 100 | — | 80 calcium carbonate 133 | 3.0 dimethylsilicone, 3.5 | | O | O |

| | Draw Ratio | Thickness ($\mu$) | Tensile Strength (kg/cm$^2$) | Elongation (%) | Tear Strength (g) | Moisture Permeability (g/m$^2$ · 24 hrs.) | Water Pressure Resistance (mm H$_2$O) |
|---|---|---|---|---|---|---|---|
| Example 10 | 1.8 | 50 | 85/43 | 110/350 | 12/65 | 2320 | 13000 |
| Example 11 | 1.8 | 50 | 144/43 | 390/850 | 48/120 | 1850 | 21000 |
| Example 12 | 1.8 | 50 | 80/31 | 120/280 | 10/72 | 2230 | 14000 |
| Example 13 | 2.0 | 60 | 128/43 | 320/660 | 32/89 | 1520 | 13000 |
| Example 14 | 2.0 | 60 | 118/36 | 230/540 | 21/73 | 1820 | 12000 |
| Example 15 | 1.8 | 50 | 146/45 | 360/720 | 38/97 | 1840 | 21000 |

We claim:

1. A process for the preparation of porous sheets, which comprises providing a composition comprising 100 parts by weight of a polyolefin resin, 50 to 400 parts by weight of a filler and 0.1 to 10 parts by weight of a silicone oil; forming said composition into a sheet; and drawing said sheet to form a porous sheet.

2. A process according to claim 1, wherein the polyolefin resin is polypropylene, medium pressure method polyethylene or low pressure method polyethylene.

3. A process according to claim 1, wherein the silicone oil is polydimethylsiloxane or polymethylphenylsiloxane.

4. A process according to claim 1, wherein drawing is carried out in at least one direction at a draw ratio of 1.2 to 3.0 at a temperature lower than the melting point of the polyolefin resin.

5. A process according to claim 1, wherein the filler is an inorganic substance or an inorganic metal salt composed mainly of an inorganic substance, which has an average particle size of 0.05 to 30$\mu$.

6. A process according to claim 1, wherein the polyolefin resin is a mixture of a crystalline polyolefin resin and a copolymer of ethylene with an $\alpha$-olefin having a crystallization degree of 5 to 25% and a density of 0.86 to 0.90 g/cm$^3$.

7. A process according to claim 4, wherein drawing is carried out at a temperature lower by 10° C. than the melting point of the polyolefin resin.

* * * * *

UNITED STATES PATENT AND TRADEMARK OFFICE
CERTIFICATE OF CORRECTION

PATENT NO. : 4,767,580
DATED : August 30, 1988
INVENTOR(S) : SHINGO KANEKO, ET AL.

It is certified that error appears in the above-identified patent and that said Letters Patent is hereby corrected as shown below: On the title page The first named inventor's name should be changed from "KANEKO SHINGO", to read --SHINGO KANEKO--.

Item (19) "Shingo et al" should read

-- Kaneko et al. --.

Signed and Sealed this

Seventeenth Day of January, 1989

Attest:

DONALD J. QUIGG

Attesting Officer

Commissioner of Patents and Trademarks